United States Patent
Razdan et al.

[11] Patent Number: 5,813,232
[45] Date of Patent: Sep. 29, 1998

[54] DRY LOW EMISSION COMBUSTOR FOR GAS TURBINE ENGINES

[75] Inventors: Mohan K. Razdan, Indianapolis; Jacob T. McLeroy, Franklin; Duane A. Smith, Carmel, all of Ind.

[73] Assignee: Allison Engine Company, Inc., Indianapolis, Ind.

[21] Appl. No.: 462,511

[22] Filed: Jun. 5, 1995

[51] Int. Cl.⁶ .................................................... F02C 1/00
[52] U.S. Cl. ......................... 60/737; 60/748; 60/39.091; 239/403
[58] Field of Search ........................ 60/737, 748, 39.091, 60/740, 739, 746; 431/9, 185; 239/400, 403

[56] References Cited

U.S. PATENT DOCUMENTS

| | | |
|---|---|---|
| 3,859,787 | 1/1975 | Anderson et al. .......................... 60/748 |
| 4,222,232 | 9/1980 | Robinson . |
| 4,265,085 | 5/1981 | Fox et al. . |
| 4,671,069 | 6/1987 | Sato et al. . |
| 4,746,859 | 5/1988 | Malik . |
| 4,802,334 | 2/1989 | Eder et al. . |
| 4,850,194 | 7/1989 | Fuglistaller et al. ....................... 60/748 |
| 4,898,001 | 2/1990 | Kuroda et al. . |
| 4,984,429 | 1/1991 | Waslo et al. . |
| 5,016,443 | 5/1991 | Shimizu et al. . |
| 5,038,558 | 8/1991 | Sohma et al. . |
| 5,062,792 | 11/1991 | Maghon ..................................... 60/748 |
| 5,101,633 | 4/1992 | Keller et al. .............................. 60/748 |
| 5,127,221 | 7/1992 | Beebe . |
| 5,164,668 | 11/1992 | Alfors . |
| 5,165,241 | 11/1992 | Joshi et al. . |
| 5,218,824 | 6/1993 | Cederwall et al. . |
| 5,251,447 | 10/1993 | Joshi et al. . |
| 5,259,184 | 11/1993 | Borkowicz et al. . |
| 5,261,239 | 11/1993 | Barbier et al. . |
| 5,263,325 | 11/1993 | McVey et al. . |
| 5,274,991 | 1/1994 | Fitts . |
| 5,289,686 | 3/1994 | Razdan et al. . |
| 5,295,352 | 3/1994 | Beebe et al. . |
| 5,309,709 | 5/1994 | Cederwall et al. . |
| 5,319,923 | 6/1994 | Leonard et al. . |
| 5,319,935 | 6/1994 | Toon et al. . |
| 5,321,947 | 6/1994 | Sood et al. . |
| 5,327,727 | 7/1994 | Ward . |
| 5,339,635 | 8/1994 | Iwai et al. . |
| 5,345,768 | 9/1994 | Washam et al. . |
| 5,394,688 | 3/1995 | Amos ......................................... 60/748 |
| 5,435,126 | 7/1995 | Beaudoin .................................. 60/748 |

*Primary Examiner*—Charles G. Freay
*Attorney, Agent, or Firm*—Woodard, Emhardt, Naughton Moriarty & McNett

[57] ABSTRACT

The present invention relates generally to a low emission can-annular combustion system for an industrial gas turbine engine to satisfy increasingly stringent environmental requirements. The combustion system of the present invention employs a dual mode combustion technique to meet engine operability requirements and high power emission targets without the use of combustor diluent injection or post combustor exhaust treatment. A lean premix combustion mode is utilized to minimize primary zone combustion temperatures and limit the oxide of nitrogen production during high power engine operation. A pilot-starting auxiliary fueling system is utilized to augment the main premix fueling system. The lean premix combustion mode is enabled by a lean premix dome having a fixed axial swirler with radial fuel pathways connecting to a circumferential main fuel manifold for distributing the fuel more uniformly across the flow path. A converging portion in the lean premix dome accelerates the fluid flow to prevent flashback from the primary combustion zone.

17 Claims, 10 Drawing Sheets

DRY LOW EMISSION COMBUSTOR FOR GAS TURBINE ENGINES

BACKGROUND OF THE INVENTION

The present invention relates generally to gas turbine engine combustors, and more particularly in one form of the present invention to a dry low emission combustor for use in an industrial gas turbine.

Air polluting emissions are an undesirable by-product from the operation of a gas turbine engine that burns fossil fuels. The primary air polluting emissions produced by the burning of fossil fuels include carbon dioxide, water vapor, oxides of nitrogen, carbon monoxide, unburned hydrocarbons, oxides of sulfur and particulates. Of the above emissions, carbon dioxide and water vapor are generally not considered objectionable. However, worldwide concerns regarding air pollution have led to stricter regulations restricting the remaining pollutants, mentioned above, emitted in the exhaust of gas turbine engines.

Gas turbine engine designers generally accept that the majority of the by-products emitted in the exhaust gas can be controlled by design modifications, cleanup of exhaust gases and/or regulating the quality of fuel. For example, particulates in the exhaust gas have been controlled by design modifications to the combustors and fuel injectors, or by removing the particulates with traps and filters. Sulfur oxides are normally controlled by selecting fuels that are low in sulfur content. Therefore the remaining emissions of primary concern in the exhaust gases are oxides of nitrogen and unburned hydrocarbons.

The principal mechanism for the formation of oxides of nitrogen involves the direct oxidation of nitrogen and oxygen, and the rate of the chemical reaction producing this by-product is an exponential function of temperature. It is well known to those skilled in the art that the oxidation of nitrogen in gas turbine engines is dependent upon the temperature in the primary combustion zone. Consequently, a small reduction in temperature within the primary combustor zone can result in a large reduction in the quantity of oxides of nitrogen.

Until recently, reductions in the emissions of oxides of nitrogen from a gas turbine engine have been obtained by reducing the flame temperature in the combustor, such as through diluent injection which involves injecting large amounts of water or steam directly into the primary combustion zone. Additionally, exhaust gas emissions have been reduced through the use of selective catalytic reduction systems. Diluent injection and selective catalytic reduction have specific limitations and problems including high installation cost, high operating cost, fuel consumption penalties, and reduced engine reliability. The potential overall emission reduction stemming from a diluent injection system may be limited because the emissions of carbon monoxide and unburned hydrocarbons are significantly increased by diluent injection.

Most recently, gas turbine engine designers and manufacturers have generally adopted a lean premix combustion technique to reduce the pollutant emissions from the engine by altering the basic combustion process where the pollutants are formed, thereby making the combustion process inherently clean. In lean premix combustion the fuel and air are premixed to a fuel lean proportion prior to combustion. The premixing of the fuel and air in this fashion avoids the high temperature stoichiometric regions in the combustor that have contributed to the formation of oxides of nitrogen.

Although the prior techniques for reducing the emissions of oxides of nitrogen from gas turbine engines are steps in the right direction, the need for additional improvements still remain. The present invention satisfies this need in a novel and unobvious way.

SUMMARY OF THE INVENTION

One form of the present invention contemplates a combustor for receiving a flow of fuel from an external source and a flow of air from a compressor, comprising: a combustion housing having an upstream end and a downstream end; and a pre-mix dome connected to the upstream end of the combustion housing for receiving and substantially premixing the fuel and air prior to delivery to the upstream end of the combustion housing, the pre-mix dome comprising: a centerbody extending longitudinally through the pre-mix dome, a vaned swirler positioned around the centerbody for turning and mixing the fuel and air passing through the pre-mix dome; a fueling pathway positioned radially along the swirler for delivering fuel across the swirler; and an annular premixing chamber positioned around the centerbody and adjacent the swirler and having a narrowing for accelerating the flow of fuel and air passing through the pre-mix dome to the upstream end of the combustion housing to reduce flashback into the pre-mix dome.

One object of the present invention is to provide an improved combustor for a gas turbine engine.

Related objects and advantages of the present invention will be apparent from the following description.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
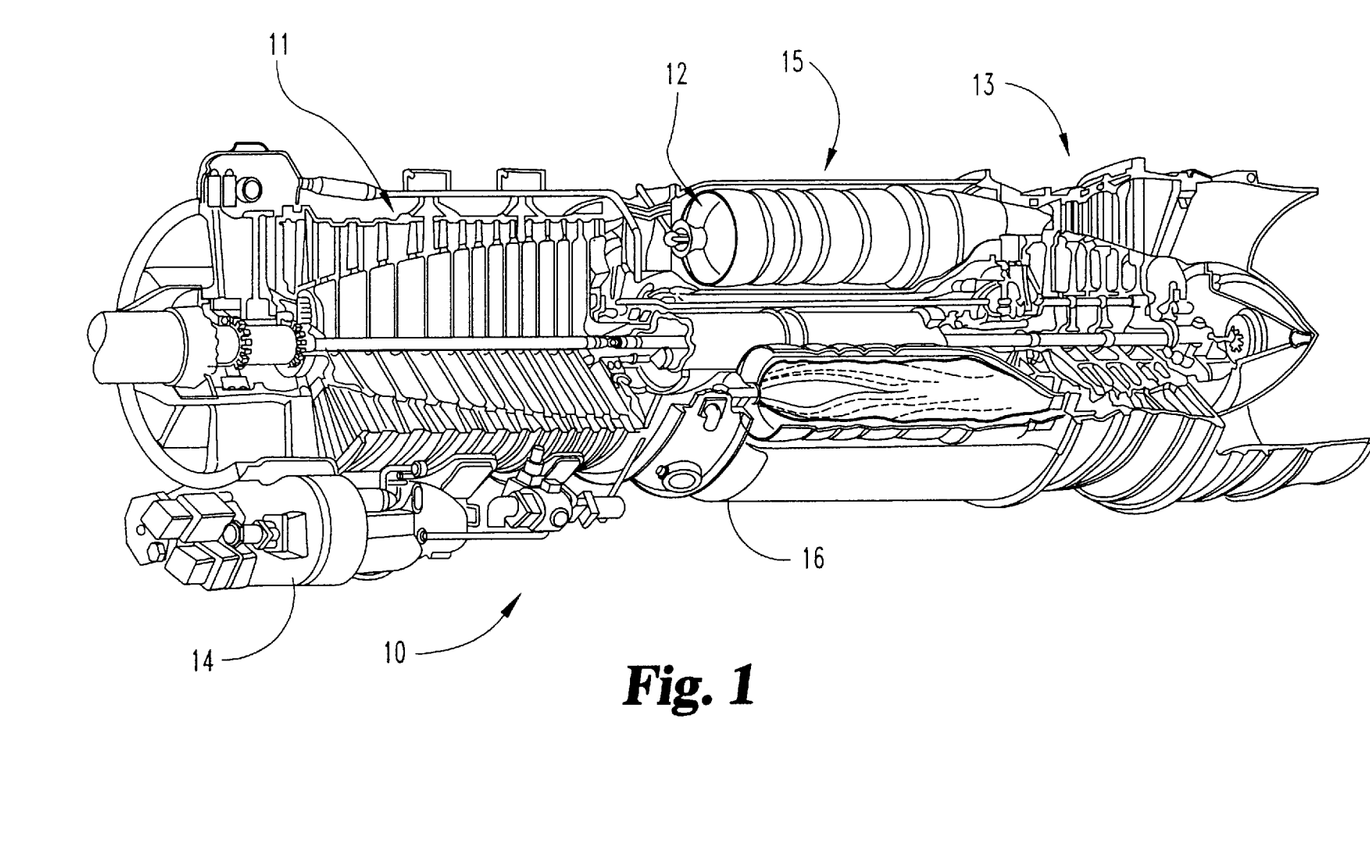
FIG. 1 is a partially fragmented side elevational view of an industrial gas turbine engine including a combustor comprising one form of the present invention.

Referring to FIG. 1, there is illustrated a natural gas fueled industrial gas turbine engine 10. The industrial gas turbine engine illustrated in FIG. 1 is a single shaft model 501-K which is manufactured by Allison Engine Company of Indianapolis, Ind. It is understood that other gas turbine engines could utilize the present invention. An industrial gas turbine engine 10 generally integrates a compressor 11, a combustor 12 and a power turbine 13. It is important to realize that there are a multitude of ways in which the components can be linked together. Additional compressors and turbines could be added with intercoolers connecting between the compressors and reheat combustion chambers could be added between the turbines.

In the preferred embodiment a combustion system 15 comprises six can type combustion liners 12 that are located in an annulus 16 formed by the outer and inner engine casings. It is understood that other combustion systems are contemplated by this invention. Industrial gas turbine engines are used for electric power generations including stand by, continuous, and co-generation applications on land based, oil drilling rigs and ship board installations. Further, industrial gas turbine engines historically have been used to drive compressors in oil and gas recovery, and pipe line service systems as well as providing propulsion power for hydrofoil and conventional vessels.

Figure 2:
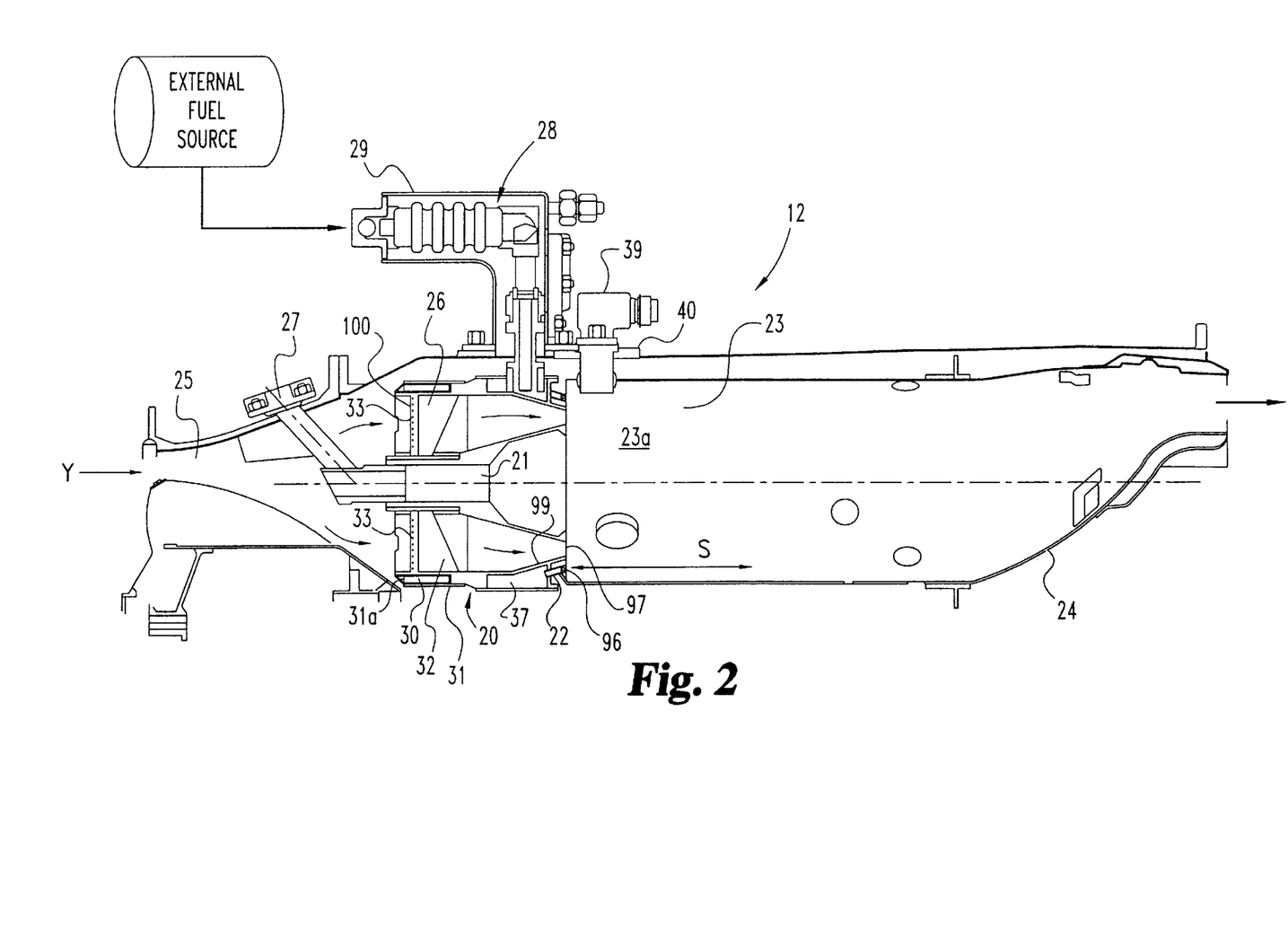
FIG. 2 is an illustrative side elevational sectional view of the combustor of FIG. 1.

With reference to FIG. 2, there is illustrated a side elevational view in full section of the preferred embodiment of combustor 12 which forms a portion of combustion system 15. The combustor 12 utilizes a dual mode combustion technique to meet pollutant emission requirements and engine operability requirements. The two modes of operation are generally referred to as premixed combustion, and pilot-starter diffusion flame combustion. A premixed combustion technique mixes the fuel and air prior to delivery into a primary combustion zone 23a within a liner barrel 23. During the pilot-starter diffusion flame mode of combustion, fuel is directly injected into the primary combustion zone 23a of combustion liner barrel 23 by a pilot-starter fuel injection system 22. The pilot-starter combustion mode operates under a conventional diffusion flame technology that is well known to those skilled in the art.

It is known that premix combustion techniques help to maintain the entire combustor volume at a high degree of uniformity in regards to fuel/air ratio and temperature distribution, and hot spots are minimized or eliminated. However, premixed combustion is not generally available at start up, idle and under low power operation. When the power output of the engine is increased above approximately 25% of full power, a main fuel system is activated and the engine begins to transfer from the pilot-starter diffusion flame combustor mode to the premix mode of operation. Within the range of about 25% to about 80% of full power the fraction of the total fuel provided through the pilot-starter fuel injection system 22 is reduced while the fraction of the fuel provided by the main fuel system is increased.

In the preferred embodiment at power output levels greater than about 80% of full power, the pilot-starter fuel injection system 22 is shut off and the engine operates under premix combustion exclusively. While the dual mode system is transitioning from one mode of combustion to the other the fraction of fuel provided through the pilot-starter fuel injection system 22 is regulated by a control system that utilizes measured compressor inlet temperature and measured turbine outlet temperature. These parameters are inputs to the control algorithm so that the correspondence between pilot fuel fraction and power level will vary according to local atmospheric conditions and the specifics of the engine installation.

The combustor 12 consists of a lean premix dome 20, a centerbody 21, a pilot-starter fuel injection system 22, a combustion liner barrel 23, and a combustor turbine transition piece 24. In combustor 12, air flow exits the compressor 11 in the direction of arrow Y and passes through a diffuser 25 to enter the lean premix dome 20 through an axial swirler 26. The lean premix dome 20 is connected to the case of the gas turbine engine by a forward liner support 27. The term dome as used herein is employed to define a chamber of any shape notwithstanding that dome is used in some other contexts to be limited to a hemispherical shape.

The combustor 12 of the present invention requires that fuel is deliverable to both the premix dome 20 and the primary combustion zone 23a. A gas tight connection is necessary between the lean premix dome 20 and the exterior gas supply. In the preferred embodiment a flexible bellows 28 is enclosed by a bellow housing 29 which is pressurized to the compressor discharge pressure during operation. A main fuel manifold 30 is connected by a fuel passageway to the flexible bellows 28 and ultimately to the external fuel source. In the preferred embodiment the main fuel manifold 30 is located between the inner surface 31a of an outer casing 31 of lean premix dome 20 and a lean premix dome liner 99. The main fuel manifold 30 is of a substantially flat ring shape and extends around the circumference of the lean premix dome 20.

In the preferred embodiment of lean premix dome 20 the fuel passes radially inward through a passageway formed in each of a plurality of cast vanes 32 that comprise a portion of an axial swirler 26. Each of the vanes 32 has a plurality of small apertures 33 formed upstream from the axial midpoint of the vanes for distributing the fuel from the main fuel manifold 30 to the air flowing from the compressor 11 into the axial swirler 26. In the preferred embodiment the plurality of apertures 33 are located adjacent the leading edge 100 of each of the vanes 32. It is understood that between the vanes there are passages for the air and fuel mixture to flow through. The fixed axial swirler 26 turns the air relative to its point of entry into the axial swirler, and the swirling mixture of fuel and air exiting the axial swirler 26 enters an annular premix chamber 34 that is positioned between the centerbody 21 and the lean premix dome liner 99. Premixing chamber 34 is designed and manufactured to have sufficient volume to provide adequate residence time for the mixing of the fuel and air before the mixture exits the lean premix dome 20 into the primary combustion zone 23a. The primary combustion zone 23a generally occupies the volume of the combustor liner barrel 23 between the lean premix dome 20 and a plane passing through the combustion liner barrel 23, at a distance 'S' from the lean premix dome 20.

A converging portion 36 of the premix chamber 34 is formed by the geometric relationship between the centerbody 21 and the lean premix dome liner wall 98. The converging portion 36 of the premix chamber 34 functions as a throttling device to accelerate the flowing fuel and air mixture to a velocity sufficient to prevent flashback of a flame into the premix chamber 34. It is preferred that the fluid flow be accelerated to a rate of about 150–200 ft/sec. The design of the centerbody 21 and the lean premix dome liner wall 98 are such that there is no flow recirculation within the premix chamber 34 to facilitate stabilization of combustion. The swirling fuel air mixture exiting the premix dome 20 is combusted within the combustion liner barrel 23 of the combustor 12. Further, the design of the centerbody 21 and premix chamber converging portion 36 has sufficient aerodynamics to purge any flame from the lean premix dome 20, under normal operation, if for some reason flashback does occur. Furthermore, the axial swirler 26 is positioned around the centerbody 21.

The pilot-starter fuel injection system 22 is connected through the flexible bellow 28a to the external fuel source. A pilot fuel manifold 37 is disposed between the outer casing 31 and the premix dome liner 99. The pilot fuel manifold 37 is located adjacent the trailing edge 97 of the lean premix dome 20. In the preferred embodiment the fuel is natural gas. A plurality of equally spaced pilot fuel nozzles 96 are located adjacent the dome liner wall 98. Pilot fuel nozzles 96 spray fuel into the primary combustion zone 23a of combustion liner barrel 23 during engine start up, and during engine operation when the fuel lean premix operation is difficult to achieve because of unstable combustion. An igniter plug 39, located in an igniter boss 40, near the pilot nozzles 96, is utilized to ignite the fuel and air mixture within the combustion liner barrel 23.

Figure 3:
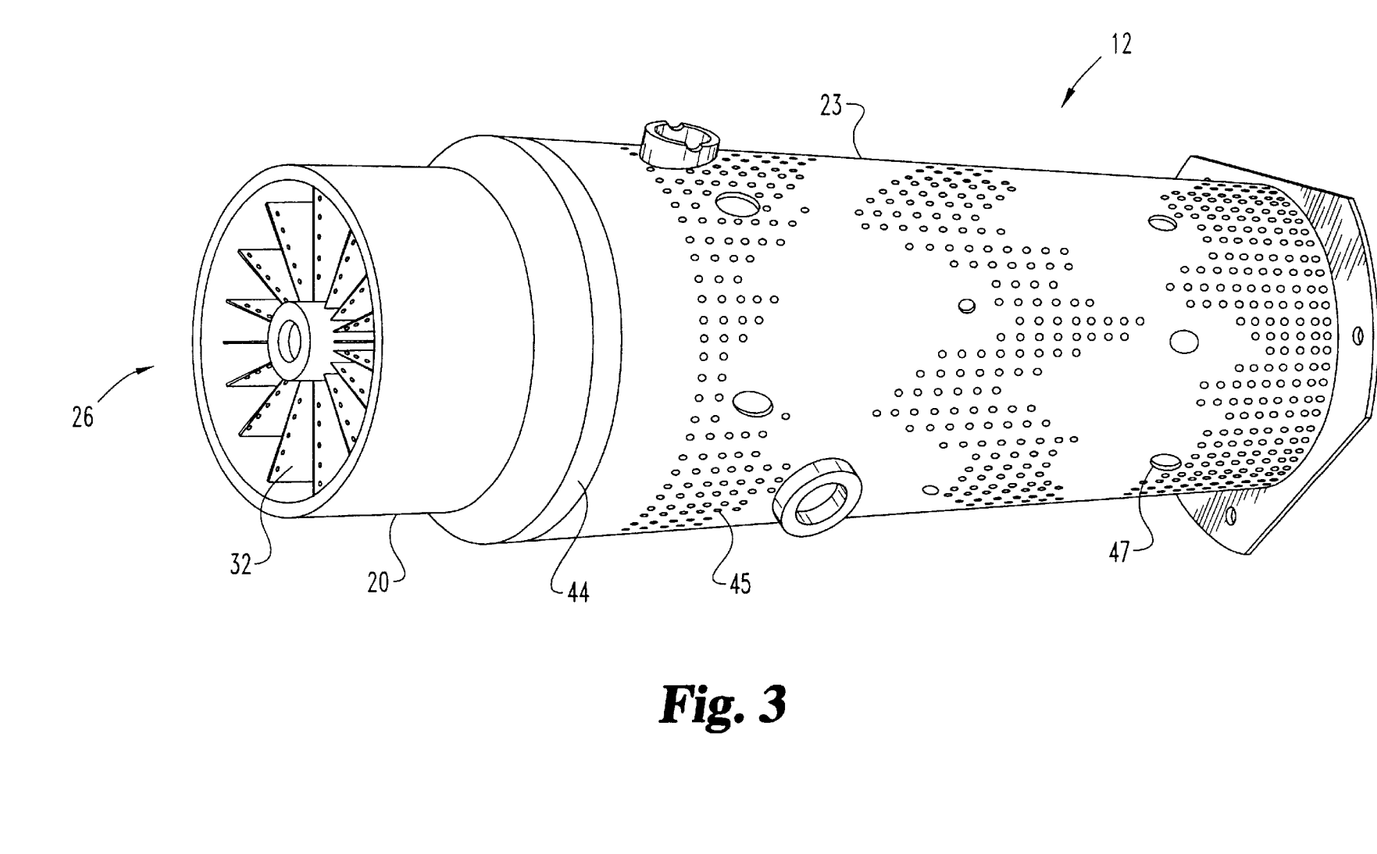
FIG. 3 is a perspective view of the FIG. 1 combustor.

Referring to FIG. 3, there is illustrated a perspective view of one form of combustor 12 with the lean premix dome 20. The substantially cylindrical liner wall 44 of the combustion liner barrel 23 is cooled using either a backside convection cooling or effusion cooling. Both of these designs are generally well known to people skilled in the art and U.S. Pat. No. 5,289,686 to Razdan provides added details thereon, and is incorporated herein by reference. The effusion cooled design includes providing several thousand small diameter holes 45 that are laser drilled at an acute angle with respect to the wall 44. In the preferred embodiment the holes 45 are formed at an angle of 20 degrees with respect to the liner wall 44. The effusion hole pattern is optimized to produce uniform wall temperatures consistent with the design requirements for this liner. Further, the inside surface of the combustion liner is coated with a thermal barrier ceramic coating. It is understood that other forms of the present invention utilize backside convention cooling, and that the combustion liner can be utilized without a thermal barrier ceramic coating.

The distribution of air from the compressor to the combustor is generally in the following ranges: about 50–65% of the air is introduced through the lean premix dome 20; about 0–20% of the air is used for the liner wall cooling; and the balance is introduced through dilution holes such as 47. In the preferred embodiment there are between six and eight dilution holes 47, having a diameter of about 0.55 inches. These dilution holes 47 are utilized to produce an acceptable exit temperature pattern in the gas before introduction into the turbine vanes.

Figure 4:
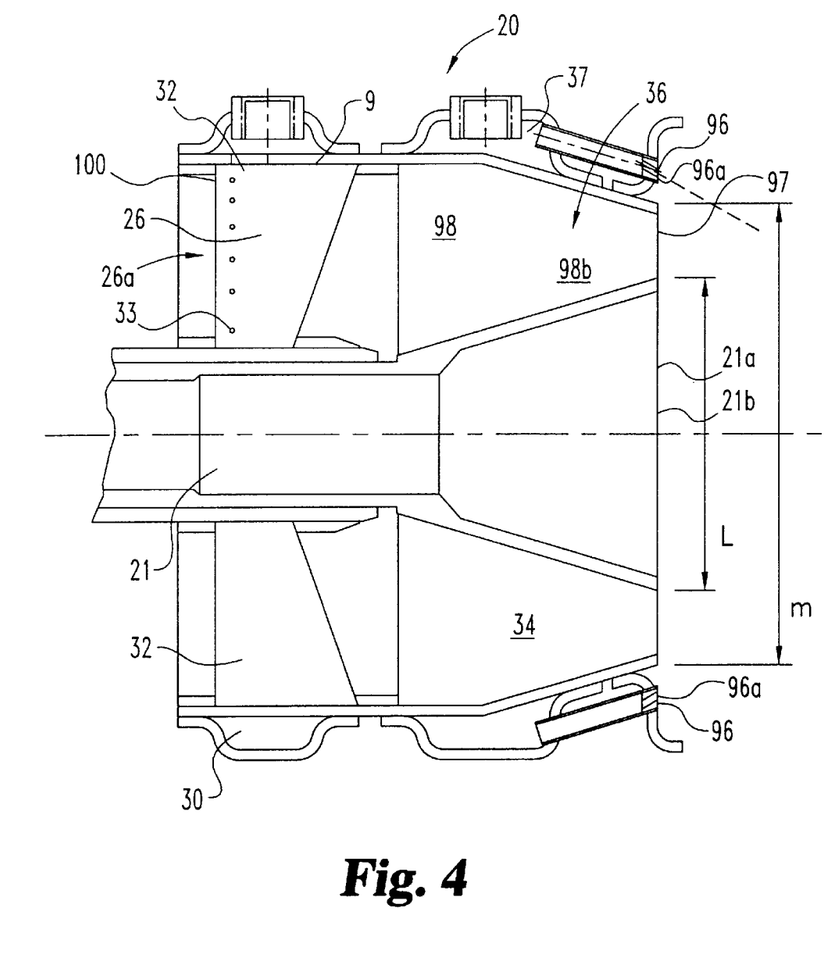
FIG. 4 is an enlarged illustrative side elevational view of the lean premix dome comprising a portion of the FIG. 2 combustor.

With reference to FIG. 4, there is illustrated an enlarged side elevational view of the lean premix dome 20. In the preferred embodiment the fixed axial swirler 26 includes twelve airfoil shaped hollow vanes 32 that are attached at their tip 9 to the main fuel manifold 30. The vanes 32 because of their airfoil design reduce the total pressure loss through the axial swirler 26, and the vanes 32 enhance the design of the lean premix dome 20 by integrating the radial fuel passageways within the vanes 32. The air passing from compressor 11 to the combustor 12 is turned from its direction at the inlet 26a about 70° by the axial swirler 26. Each vane 32 is of a variable chord design, thereby imparting a more uniform swirl angle of about 70° to the flowing fuel and air mixture. As the fuel and air flow through the axial swirler 26 an initial mixing occurs within the passages between the vanes 32. Further, mixing of the fuel and air continues in the premix chamber 34 which is downstream of the axial swirler 26. The swirl introduced to the moving fluid by the axial swirler 26 aids in the proper continued mixing of the fluids in the premix chamber 34. Flow separation of the fluid from vanes 32 is minimized or prevented by their airfoil design which minimizes the potential for any auto ignition combustion within the premix chamber 34.

Figure 6:
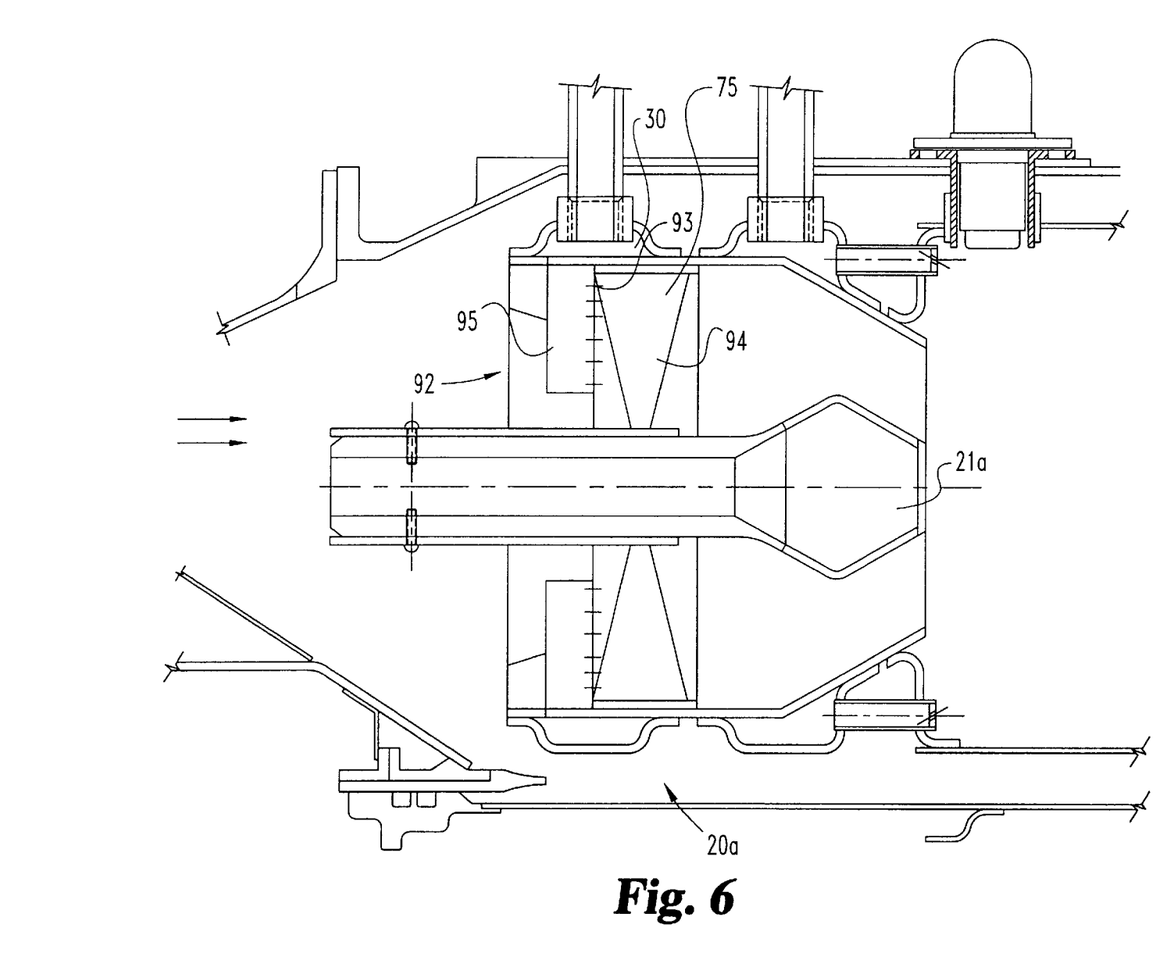
FIG. 6 is another form of the lean premix dome comprising a portion of the combustor of the present invention.
Figure 7:
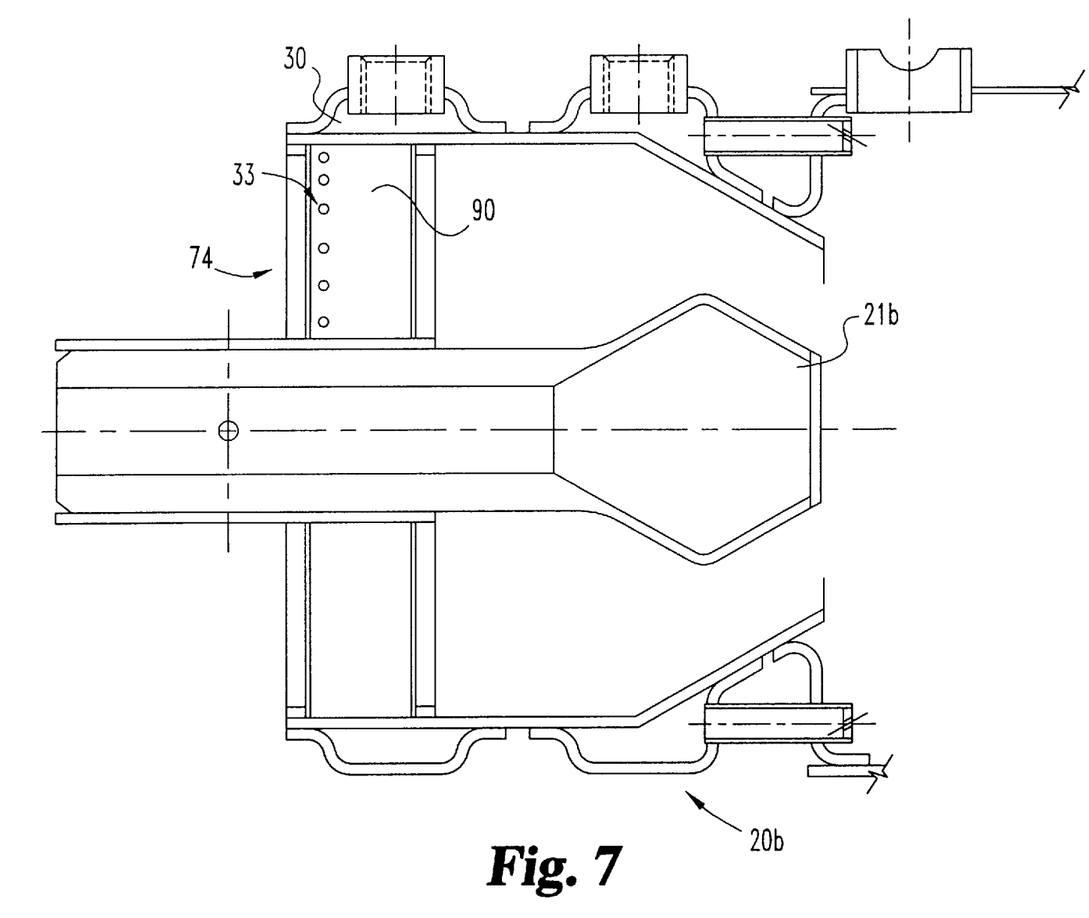
FIG. 7 is a second alternative form of the lean premix dome comprising a portion of the combustor of the present invention.
Figure 8:
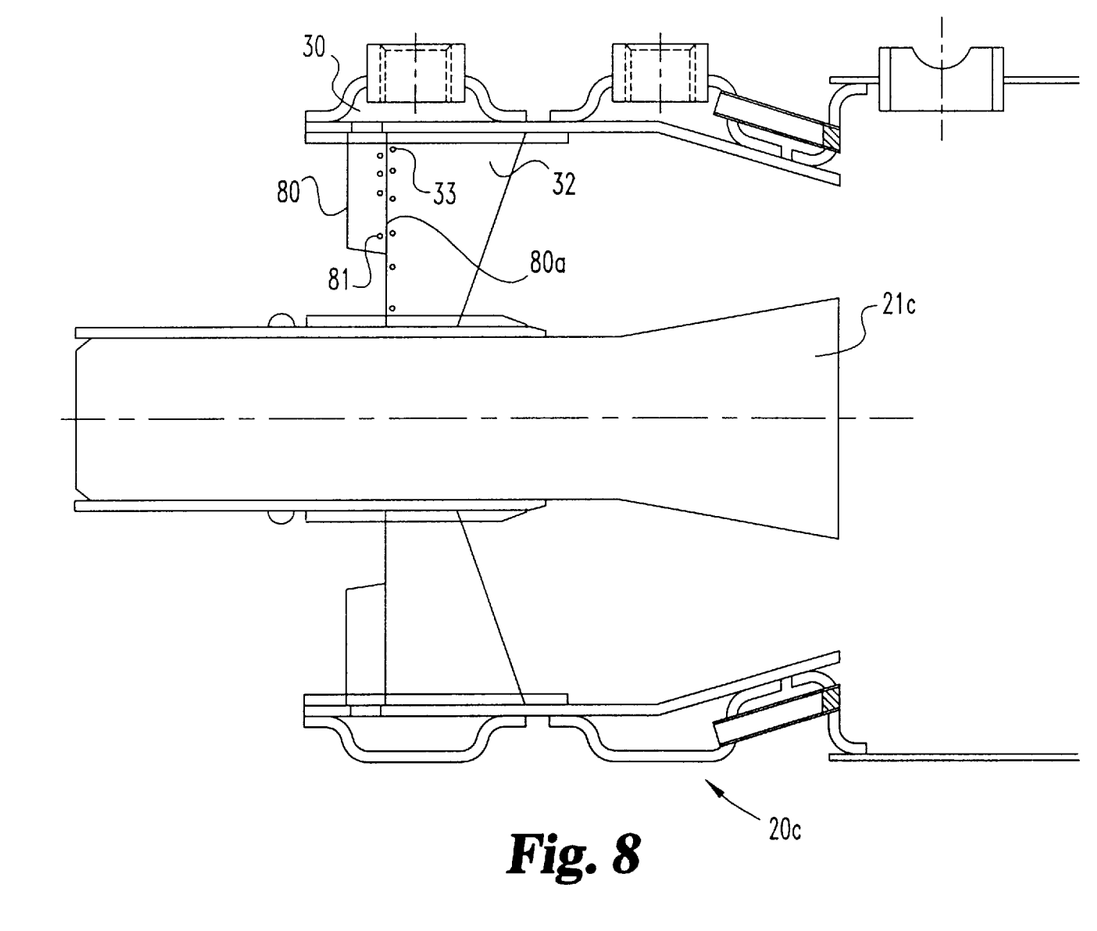
FIG. 8 is a third alternative form of the lean premix dome comprising a portion of the combustor of the present invention.
Figure 9A:
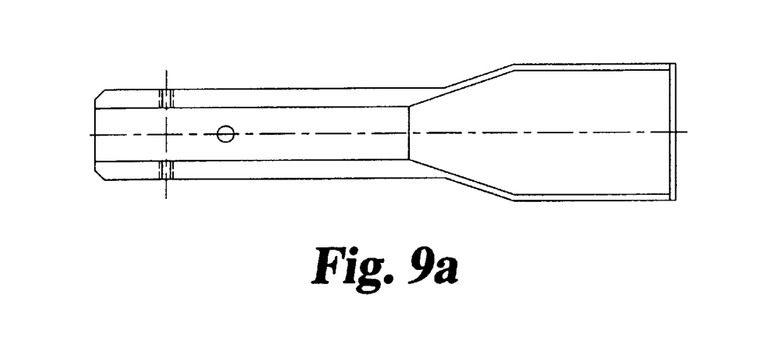
FIG. 9 is an illustrative view of alternative forms of the centerbodies comprising a portion of the lean premix domes of FIG. 6 and 7.
Figure 9B:
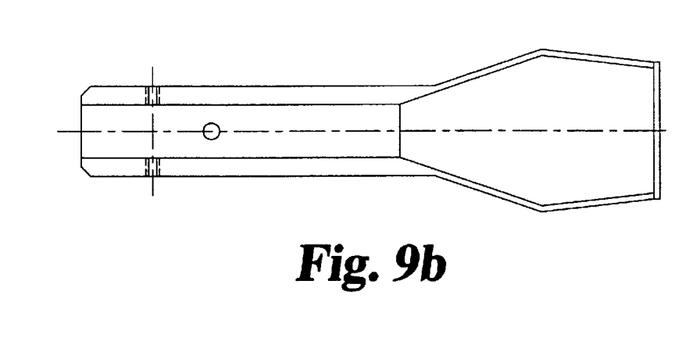
Figure 9C:
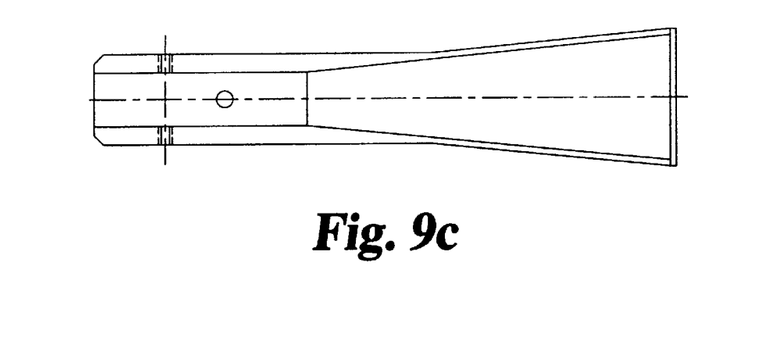
Figure 9D:
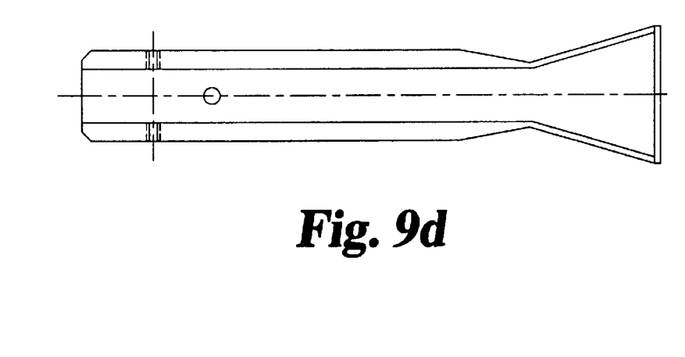
Figure 10A:
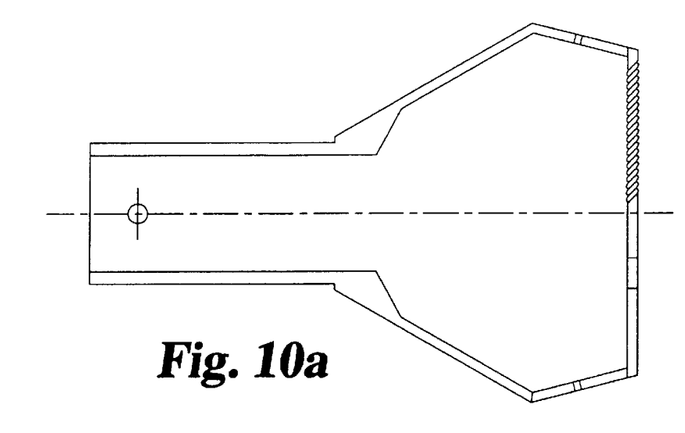
FIG. 10 is an illustrative view of alternative forms of the centerbodies comprising a portion of the lean premix domes of FIGS. 4 and 8.
Figure 10B:
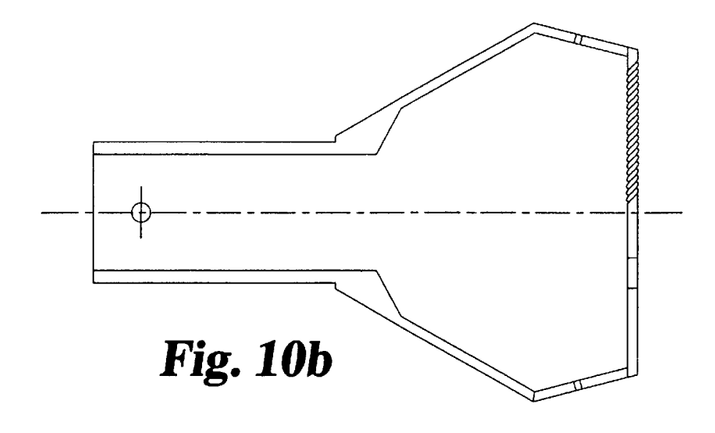
Figure 10C:
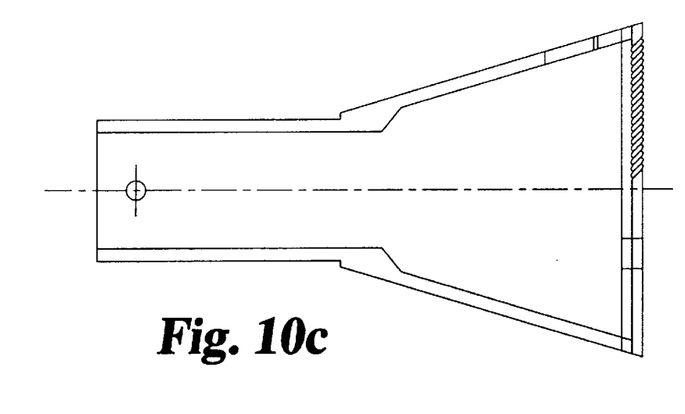
Figure 10D:
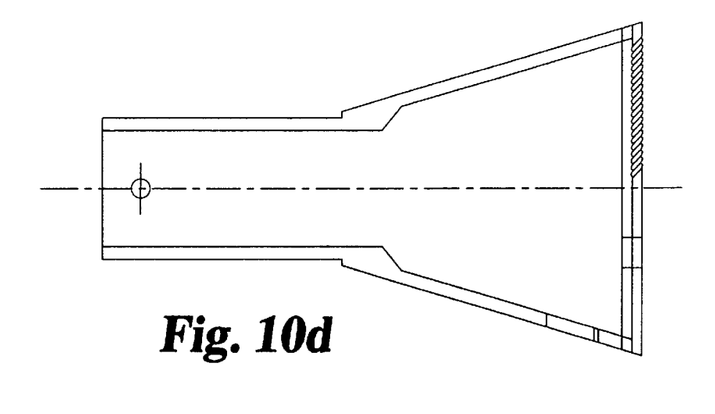

In the preferred embodiment the centerbody 21 has a maximum outside diameter 'L' of 3.124 inches. The outer diameter of the lean premix dome 20 exit has a diameter 'm' of 3.856 inches, which gives us a ratio of the centerbody diameter to the lean premix dome exit diameter of about 0.81. As can be seen in FIG. 4, the diameter of the centerbody 21 at its widest point is on the order of 100% greater than the diameter of the centerbody 21 at its root located at the exit from the vaned swirler 26. The smallest amount by which the centerbody 21 widens is about 20% of the root diameter (FIG. 8). Moreover, the maximum diameter of the centerbody 21 is about 35% of the diameter of the combustion liner barrel 23 shown in FIG. 8 and about 55% of the combustion liner barrel diameter shown in FIG. 4; also, the diameter of the centerbody tip 21a is about 20% of the diameter of the combustion barrel 23 as illustrated in FIGS. 6 and 7. Additionally, the centerbodies 21 shown in FIGS. 4 and 8 have respective areas that are about 30% and 10% of the area calculated from the diameter of the combustion liner barrel 23. It is understood that in other forms of the present invention alternative combinations of centerbody and lean premix dome exit dimensions are contemplated in order to control the fluid flow. Persons skilled in the art will recognize that it is important to control the exit velocity in order to prevent flashback, and that the geometric relation between the corresponding parts is a method to control the fluid speed.

Figure 5:
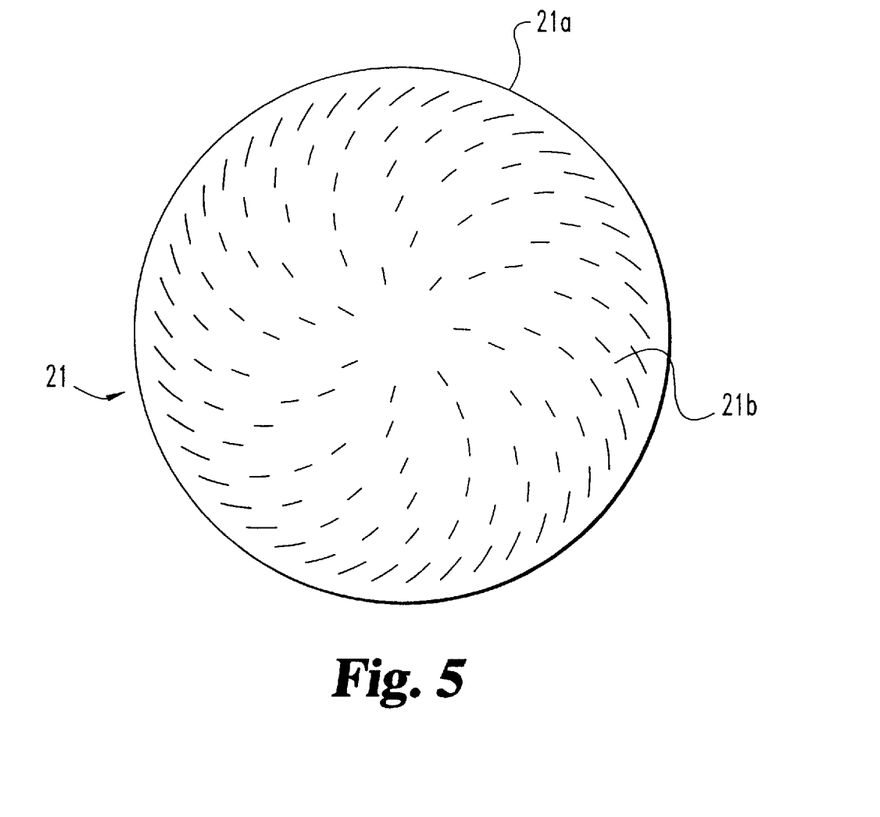
FIG. 5 is an end view of a centerbody comprising a portion of the FIG. 4 lean premix dome.

In the preferred embodiment the centerbody tip 21a and the premix dome walls 98 are protected from high temperatures by an effusion cooling design similar to that set forth for cooling the combustion liner barrel 23 (FIG. 5). The premix dome inside walls 98 and the centerbody tip 21a are coated with a thermal barrier ceramic coating (FIG. 5). In addition to protecting the walls 98 and center tip 21a the thermal barrier ceramic coating 21b and 98b, also maintains the walls at a higher temperature than is possible without the coating which helps in reducing the liner wall quenching effect on the reactions involving carbon monoxide and unburned hydrocarbons. By reducing the liner wall quenching effect the emissions of carbon monoxide and unburned hydrocarbons are reduced. It is understood that alternate forms of the present invention utilize the thermal barrier ceramic coating and effusion cooling design as required to meet specific design parameters and that some or all of the components may or may not be coated.

The pilot-starter fuel injection system 22 utilizes a circumferential pilot ring fuel manifold 37 to provide a steady flow of natural gas to the twelve equally spaced small pilot fuel nozzles 96 located on the outer surface of dome wall 98. In the preferred embodiment the pilot fuel nozzles 96 are placed at an angle of 15° to the liner wall and the fuel exit holes 96a are angled at about 45° to the liner wall. The acute angle at which the nozzle 96 is oriented relative to the liner wall results in the flame being directed away from the liner wall of the combustion liner barrel 23, thus helping to minimize liner heat distress. In an alternate form of the present invention, a single pilot fuel nozzle is located coaxial with and extends longitudinally within the centerbody, and the nozzle dispenses the fuel through the centerbody tip 21a to the primary combustion zone 23a.

With reference to FIGS. 6–8, there are illustrated alternative forms of the lean premix dome 20a, 20b and 20c. It is readily understood by one skilled in the art that these premix domes are substantially similar to the premix dome 20 of the preferred embodiment and therefore can be readily integrated into combustor 12. Further, components and features of the lean premix domes 20a, 20b and 20c are substantially similar to the premix dome 20 and have been given like element numbers.

Referring to FIG. 6, there is illustrated premix dome 20a, and distinctions from premix dome 20 are set forth below. The main fuel manifold 30 is connected to ten oval shaped fuel tubes 95 that carry the fuel radially inward from the main fuel manifold 30. The oval fuel tubes 95 are equally spaced around the fixed axial swirler 94 and the tubes 95 are located between vane swirler passages that are disposed between adjacent vanes 75. Each of the fuel tubes 95 include six small holes 93 having a diameter of about 0.05 inches which distribute the fuel into the air flowing through the axial swirler 94. The radial spacing of the fuel holes 93 is designed to distribute the fuel across the moving air path in order to increase the fuel and air mixing efficiency. The fuel holes 93 are positioned on the downstream side of the fuel tubes 95 adjacent the vanes 75. In the lean premix dome 20a the fixed axial swirler 94 turns the fluid flow about 60° from the inlet 92 to the entrance into the primary combustion zone. The diameter of the lean premix dome exit is about 2.8 inches and the centerbody exit diameter is about 1.0 inches, which gives a ratio of the centerbody to the lean premix dome exit of about 0.35.

With reference to FIG. 7, there is illustrated another form of the lean premix dome 20b that is readily integrated into combustor 12. The constant chord length airfoil shaped vanes 90 are integrated into a fixed axial swirler 94. The curved vanes 90 are designed to turn the flow of fluid from the compressor about 60° in relation to its direction at the inlet 74. Each of the twelve vanes 90 includes six small fuel holes 33 located on each side of the vane (suction and pressure) therefore the axial swirler 94 has vanes with a total of one hundred and forty four fuel exit holes 33.

With reference to FIG. 8, there is illustrated a lean premix dome 20c that is substantially identical to lean premix dome 20. Differences between the premix dome 20 and dome 20c include the addition of oval fuel tubes 80 extending radially inward from the main fuel manifold 30 towards the centerbody 21c. In one form of the present invention the fuel tubes extend radially inward about halfway to the wall of the centerbody. It is understood that radial length of the fuel tube can be varied to meet the fuel mixture requirements desired. Each of the oval fuel tubes 80 includes three fuel outlet hole 81a formed on each side of the tube at the trailing edge 80a of the oval tube 80. The location of the fuel outlet holes 81 on the oval fuel tubes 80 and the opposing fuel holes 33 on the vanes 32 are staggered with respect to each other so that the fuel dispensed from the holes is more evenly spread across the path of the air flow. In the preferred embodiment of lean premix dome 20c there are a total of two hundred and sixteen fuel holes in the combined oval fuel tube and axial swirler vanes.

A retrofittable kit is designed to replace the existing combustors within the Allison 501 series engine. The kit includes the components discussed herein that are necessary to convert the engine to a dual mode combustion system.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A combustor assembly for receiving a flow of fuel from an external source and a flow of air from a compressor, comprising:

a combustion housing having an upstream end and a downstream end; and a premix dome connected to the upstream end of said combustion housing for receiving and substantially premixing the fuel and air prior to delivery to said upstream end of said combustion housing, said premix dome comprising:

a centerbody extending longitudinally through said premix dome;

a vaned swirler having an inlet and an outlet, said vaned swirler positioned around said centerbody and turning the flow of fuel and air from said inlet to said outlet through an angle between about 60° and about 70°; and a fueling pathway for delivering fuel across said swirler.

2. The combustor assembly in claim 1, wherein said fueling pathway has apertures located upstream of the axial midpoint of said vaned swirler.

3. The combustor assembly in claim 1, wherein said vaned swirler further comprises a plurality of vanes having chords varying with radial distance from said centerbody.

4. The combustor assembly in claim 1, wherein said vaned swirler further comprises a plurality of vanes, each of said vanes having an airfoil shape for minimizing flow separation and thereby preventing auto ignition combustion within said premix dome.

5. A combustor assembly for receiving a flow of fuel from an external source and a flow of air from a compressor, comprising:

a combustion housing have an upstream end and a downstream end; and a premix dome connected to the upstream end of said combustion housing for receiving and substantially premixing the fuel and air prior to delivery to said upstream end of said combustion housing, said premix dome comprising:

a centerbody extending longitudinally through said premix dome;

a vaned swirler having an inlet, said vaned swirler positioned around said centerbody for turning and mixing the fuel and air passing through said premix dome; and a fueling pathway positioned radially along said swirler for delivering fuel across said swirler, said fueling pathway having an outlet juxtaposed with said inlet of said vaned swirler.

6. The combustor assembly in claim 5, wherein said vaned swirler is fixed relative to said premix dome and includes a plurality of vanes.

7. The combustor assembly in claim 6, wherein all of said vanes have approximately the same angular orientation with respect to said centerbody for producing a swirling flow substantially free from localized low-speed and reverse flow regions.

8. The combustor assembly in claim 6, wherein said vanes have chords varying with radial distance from said centerbody for imparting a more uniform swirl to the flow of fuel and air.

9. The combustor assembly in claim 6, wherein each of said vanes has an airfoil shape for minimizing flow separation and thereby preventing auto ignition combustion within said premix dome.

10. The combustor assembly in claim 6, wherein each of said vanes has a leading edge and a plurality of apertures formed adjacent said leading edge, and said fueling pathway comprises a plurality of fuel passageways formed in said vanes and in flow communication with said apertures of said vanes.

11. The combustor assembly in claim 10, wherein said fueling pathway further comprises a plurality of fuel tubes located upstream of said vanes, each of said fuel tubes having fuel outlet holes located adjacent a trailing edge of each of said fuel tubes and radially positioned along each of said fuel tubes so that said fuel outlet holes are staggered with respect to said apertures of said vanes for more evenly dispensing fuel across the air flow.

12. A combustor assembly for receiving a flow of fuel from an external source and a flow of air from a compressor, comprising:

a combustion housing having an upstream end and a downstream end; and a premix dome connected to the upstream end of said combustion housing for receiving and substantially premixing the fuel and air prior to delivery to said upstream end of said combustion housing, said premix dome comprising:

a centerbody extending longitudinally through said premix dome;

a vaned swirler positioned around said centerbody for turning and mixing the fuel and air passing through said premix dome, said vaned swirler including a plurality of vanes, all of said vanes having substantially the same angular orientation with respect to said centerbody for producing a swirling flow substantially free from localized low-speed and reverse flow regions; and a fueling pathway positioned adjacent said swirler for delivering fuel across said swirler.

13. The combustor assembly in claim 12, wherein said fueling pathway has apertures located upstream of the axial midpoints of said vanes.

14. The combustor assembly in claim 12, wherein said vanes have chords varying with radial distance from said centerbody.

15. The combustor assembly in claim 12, wherein each of said vanes has an airfoil shape for minimizing flow separation and thereby preventing auto ignition combustion within said premix dome.

16. A combustor assembly comprising means for dispensing fuel into air immediately at the start of the assembly, means for thoroughly blending the flow of fuel and air without producing a shear layer in the flow, means for accelerating the flow of fuel and air downstream, and means for ejecting the accelerated flow into a combustor without producing a shear layer in the flow.

17. A gas turbine engine including a compressor section for supplying compressed air, a turbine section, a combustor section positioned operatively therebetween, and a means for supplying fuel to said combustor section, said combustor section comprising:

a combustion housing having an upstream end and a downstream end; and a premix dome connected to said upstream end of said combustion housing for receiving and substantially premixing the fuel and air prior to delivery to said upstream end of said combustion housing, said premix dome comprising:

a centerbody extending longitudinally through said premix dome;

a vaned swirler having an inlet and an outlet, said vaned swirler positioned around said centerbody and turning the flow of fuel and air from said inlet to said outlet through an angle between about 60° and about 70°; and a fueling pathway connected to said means for supplying fuel for delivering fuel across said swirler.

* * * * *

UNITED STATES PATENT AND TRADEMARK OFFICE
CERTIFICATE OF CORRECTION

PATENT NO : 5,813,232

DATED : September 29, 1998

INVENTOR(S) : Mohan K. Razdan, et al.

It is certified that error appears in the above-identified patent and that said Letters Patent is hereby corrected as shown below:

In column 7, line 53, please change "81a" to --81--.
In section 56, please insert --4,078,377  3/1978  Owens et al.--
In section 56, please insert --4,263,780  4/1981  Stettler--
In section 56, please insert --4,078,377  3/1978  Owens et al.--
In section 56, please insert --3,946,552  3/1976  Weinstein et al.--
In section 56, please insert --3,886,736  6/1975  Kawaguchi--
In section 56, please insert --3,788,067  1/1974  Carlisle et al.--
In section 56, please insert --GB 2,045,422A  10/1980  Great Britain--

Signed and Sealed this

Thirtieth Day of May, 2000

Q. TODD DICKINSON

*Attest:*

*Attesting Officer*        *Director of Patents and Trademarks*